United States Patent
Kompalli

(10) Patent No.: US 9,847,974 B2
(45) Date of Patent: Dec. 19, 2017

(54) IMAGE DOCUMENT PROCESSING IN A CLIENT-SERVER SYSTEM INCLUDING PRIVACY-PRESERVING TEXT RECOGNITION

(71) Applicant: Xerox Corporation, Norwalk, CT (US)

(72) Inventor: Pramod Sankar Kompalli, Hyderabad (IN)

(73) Assignee: Xerox Corporation, Norwalk, CT (US)

( * ) Notice: Subject to any disclaimer, the term of this patent is extended or adjusted under 35 U.S.C. 154(b) by 43 days.

(21) Appl. No.: 15/140,795

(22) Filed: Apr. 28, 2016

(65) Prior Publication Data
US 2017/0317983 A1   Nov. 2, 2017

(51) Int. Cl.
G06K 9/00 (2006.01)
H04L 29/06 (2006.01)
(Continued)

(52) U.S. Cl.
CPC ...... *H04L 63/0407* (2013.01); *G06K 9/00442* (2013.01); *G06K 9/18* (2013.01); *G06K 9/2054* (2013.01); *G06K 9/6256* (2013.01); *G06N 3/088* (2013.01); *G06T 1/20* (2013.01); *G06T 3/20* (2013.01); *G06T 3/40* (2013.01); *H04L 63/1433* (2013.01); *H04L 67/42* (2013.01)

(58) Field of Classification Search
CPC . H04L 63/0407; H04L 67/42; H04L 63/1433; G06N 3/088; G06K 9/00442; G06K 9/18; G06K 9/2054; G06K 9/6256; G06T 1/20; G06T 3/20; G06T 3/40

USPC ....... 382/100, 155, 162, 168, 173, 177, 181, 382/232, 254, 276, 309, 312, 325
See application file for complete search history.

(56) References Cited

U.S. PATENT DOCUMENTS

| | | | |
|---|---|---|---|
| 5,541,993 | A | 7/1996 | Fan et al. |
| 6,505,299 | B1 | 1/2003 | Zeng et al. |

(Continued)

OTHER PUBLICATIONS

C. Balamurugan, S. Roy, J. O'Neill, and S. Gujar, "An automated crowdsourcing system with intelligent microtasking, optimized distribution, and automatic integration and validation," Quality ID at Xerox, Tech. Rep. 20120199, 2012.

(Continued)

*Primary Examiner* — Sheela C Chawan
(74) *Attorney, Agent, or Firm* — Gibb & Riley, LLC

(57) ABSTRACT

Disclosed are devices and methods for processing an image document in a client-server environment such that privacy of text information contained in the image document is preserved. Specifically, in a client-server environment, an image document can be processed using a local computerized device of a client to create an obfuscated document by identifying word images in the image document and scrambling those word images. The obfuscated document can be received by a server of a service provider over a network (e.g., the Internet) and processed by previously trained software (e.g., a previously trained convolutional neural network (CNN)) to recognize specific words represented by the scrambled images in the obfuscated document without having to reconstruct the image document. Since the image document is neither communicated over the network, nor reconstructed and stored on the server, privacy concerns are minimized.

18 Claims, 12 Drawing Sheets

(51) Int. Cl.
G06K 9/20 (2006.01)
G06T 3/40 (2006.01)
G06T 3/20 (2006.01)
G06T 1/20 (2006.01)
G06K 9/62 (2006.01)
G06K 9/18 (2006.01)
G06N 3/08 (2006.01)

(56) References Cited

U.S. PATENT DOCUMENTS

| | | | |
|---|---|---|---|
| 6,546,119 B2 | 4/2003 | Ciolli et al. | |
| 7,456,983 B2* | 11/2008 | Meador | H04N 1/4446 358/1.1 |
| 7,747,070 B2 | 6/2010 | Puri | |
| 8,189,781 B1* | 5/2012 | Hartman | H04N 1/448 380/210 |
| 8,270,718 B2* | 9/2012 | Drory | G06K 9/00442 382/181 |
| 8,823,798 B2* | 9/2014 | Bernal | G06K 9/00228 348/149 |
| 8,931,044 B1 | 1/2015 | Subramanian | |
| 2008/0117295 A1 | 5/2008 | Ebrahimi et al. | |
| 2012/0054112 A1 | 3/2012 | Gormish et al. | |
| 2013/0279690 A1 | 10/2013 | Durham et al. | |
| 2014/0208201 A1* | 7/2014 | Bustelo | G06F 17/218 715/235 |

OTHER PUBLICATIONS

A. Frome, G. Cheung, A. Abdulkader, M. Zennaro, B. Wu, A. Bissacco, Adam, H. Neven, and L. Vincent, "Large-scale privacy protection in google street view," in Proc. ICCV, 2009.
P. Agrawal and P. Narayanan, "Person de-identification in videos," IEEE Transactions on Circuits and Systems for Video Technology, vol. 21(3), pp. 299-310, 2011.
WordLens App, http://questvisual.com, p. 1 (publication date unknown).
Lost in China & Lost in Japan Apps, http://www.lucsens.com/, pp. 1-2, © Lucsens 2010.
Pramod Sankar K., R. Manmatha, and C. V. Jawahar, "Large scale document image retrieval by automatic word annotation," IJDAR, vol. 17(1), pp. 1-17, 2014.
T. Rath and R. Manmatha, "Word image matching using dynamic time warping," in Proc. CVPR, 2003, pp. 521-527.
I. Z. Yalniz and R. Manmatha, "An efficient framework for searching text in noisy document images," in Proc. DAS, 2012, pp. 48-52.
V. Goel, A. Mishra, K. Alahari, and C. V. Jawahar, "Whole is greater than sum of parts: Recognizing scene text words," in Proc. ICDAR, 2013.
X. Chen, X. Cheng, and S. Mallat, "Unsupervised deep haar scattering on graphs," in Proc. NIPS, 2014, pp. 1709-1717.
T. S. Cho, S. Avidan, and W. Freeman, "A probabilistic image jigsaw puzzle solver," in Proc. CVPR, 2010, pp. 183-190.
K. Son, J. Hays, and D. Cooper, "Solving square jigsaw puzzles with loop constraints," in Proc. ECCV, vol. 8694, 2014, pp. 32-46.
"The switchboard dataset," http://www.isip.piconepress.com/projects/switchboard/.
Y. Jia, "Caffe: An open source convolutional architecture for fast feature embedding," http://caffe.berkeleyvision.org/, 2013.
A. Krizhevsky, I. Sutskever, and G. E. Hinton, "Imagenet classification with deep convolutional neural networks," in Proc. NIPS, 2012, pp. 1106-1114.
J. Deng, W. Dong, R. Socher, L.-J. Li, K. Li, and L. Fei-Fei, "ImageNet: A Large-Scale Hierarchical Image Database," in Proc. CVPR, 2009.
A. S. Razavian, H. Azizpour, J. Sullivan, and S. Carlsson, "CNN features off-the-shelf: an astounding baseline for recognition," CoRR, vol. abs/1403.6382, 2014.
J. Donahue, Y. Jia, O. Vinyals, J. Hoffman, N. Zhang, E. Tzeng, and Darrell, "Decaf: A deep convolutional activation feature for generic visual recognition," in Proc. ICML, 2014.
R. B. Girshick, J. Donahue, T. Darrell, and J. Malik, "Rick feature hierarchies for accurate object delection and semantic segmentation," in Proc. CVPR, 2014, pp. 580-587.
http://www.image-net.org/ © 2014 Stanford Vision Lab, Stanford University, Princeton University, p. 1.

* cited by examiner

| ONC | age | age | *age* | age | age | ... |
|---|---|---|---|---|---|---|
| | appeal | appeal | *appeal* | appeal | appeal | |
| | automatic | automatic | *automatic* | automatic | automatic | |
| | automobile | automobile | *automobile* | automobile | automobile | |
| | baby | baby | *baby* | baby | baby | |
| | bag | bag | *bag* | bag | bag | |
| | blue | blue | *blue* | blue | blue | |
| | budget | budget | *budget* | budget | budget | |
| | | | | | | |

FIG. 5

IMAGE DOCUMENT PROCESSING IN A CLIENT-SERVER SYSTEM INCLUDING PRIVACY-PRESERVING TEXT RECOGNITION

BACKGROUND

The devices and methods disclosed herein generally relate to image document processing and, more particularly, to processing an image document in a client-server environment such that privacy of text information contained in the image document is preserved.

More particularly, image document processing and, particularly, text recognition (also referred to herein as optical character recognition (OCR)) is prevalent in many client-server applications, wherein a client uploads an image document to a server for processing. For example, it is used in document process outsourcing for recognition of text in forms, for conversion of handwritten notes to text, etc. One of the challenges associated with these client-server applications is preserving the privacy of the information contained in the recognized text, particularly, when public cloud servers are used. For example, privacy is a serious concern in situations where a public cloud server is used to recognize text in healthcare forms because individuals do not want their privacy violated by server operators and because of privacy laws set forth in the Health Insurance Portability and Accountability Act (HIPAA). Privacy is also a serious concern in situations where a public cloud server is used to convert handwritten notes to text, depending upon the nature of the hand written text. Risks associated with potential of hacking of either servers that maintain stored copies recognized text and/or with potential hacking of communication channels used to transmit image documents to servers also raise privacy concerns. Therefore, there is a need in the art for systems and methods that can be applied to a client-server environment and that can process an image document to recognize text and concurrently preserve the privacy of the information contained in the recognized text.

SUMMARY

In view of the foregoing, disclosed herein are devices and methods for processing an image document in a client-server environment such that privacy of text information contained in the image document is preserved. Specifically, in a client-server environment, an image document can be processed using a local computerized device of a client to create an obfuscated document (i.e., a document that is rendered unclear, unintelligible, etc.) by identifying word images in the image document and scrambling those word images. The obfuscated document can be received by a server of a service provider over a network (e.g., the Internet) and processed by previously trained software and, particularly, a previously trained convolutional neural network (CNN) to recognize specific words represented by the scrambled images in the obfuscated document and, thereby perform text recognition without having to reconstruct the image document. Since the image document is neither communicated over the network, nor reconstructed and stored on the server, privacy concerns are minimized.

More particularly, disclosed herein is a client-server computing system used for image document processing and incorporating at least one computerized device of a client and at least one server of a service provider, wherein the computerized device(s) of the client(s) and the server(s) of the service provider communicate over a network (e.g., the Internet).

Each client computerized device can comprise a memory, a network interface and a processor in communication with the memory and the network interface. The memory can store an image document (e.g., a scanned-in document or a digital photograph). The processor can process the image document in order to create an obfuscated document (i.e., a document that is rendered unclear, unintelligible, etc.). Specifically, the processor can analyze the image document to identify at least one text region and at least one word image contained in the at least one text region. For each word image, the processor can perform the following: resize the word image so that it is a predetermined size; overlay the word image with a grid of cells, which has the same predetermined size and which comprises a first number of columns and a second number of rows, such that the cells contain portions of the word image; and, using a selected shuffling pattern, shuffle positions of the cells within the grid to move the portions of the word image. Moving the portions of the word image in this manner creates a corresponding scrambled image, wherein the word image is unrecognizable to the human eye and to conventional image document processors. The processor can replace all word images in the image document with corresponding scrambled images and, thus, can generate the obfuscated document. Once the obfuscated document is generated, the network interface can communicate the obfuscated document to a computer server over a network (e.g., the Internet).

Each computer server can similarly comprise a memory, a network interface and a processor in communication with the memory and the network interface. The network interface can receive an obfuscated document (i.e., a document that is rendered unclear, unintelligible, etc.) from a client computerized device over a network. As discussed above, the obfuscated document can be created by the client computerized device from an image document, which comprises at least one word image, and the obfuscated document can comprise at least one scrambled image, wherein each scrambled image in the obfuscated document corresponds to a single word image in the image document. The memory can store the obfuscated document and the processor can access and process the obfuscated document. Specifically, in processing the obfuscated document, the processor can evaluate each specific scrambled image individually to recognize a specific word represented by that specific scrambled image. For example, the processor can execute previously trained software (i.e., a previously trained convolutional neural network (CNN)) to evaluate a specific scrambled image in order to recognize the specific word represented by that specific scrambled image in the obfuscated document. Thus, the processor can process the obfuscated document and, particularly, perform text recognition without having to reconstruct the image document.

Also disclosed herein are integrated image document processing methods, which are performed in a client-server environment that incorporates at least one computerized device of a client and at least one server of a service provider, wherein the computerized device(s) of the client(s) and the server(s) of the service provide communicate over a network (e.g., the Internet).

Specifically, an image document processing method performed by a client computerized device in client-server environment can comprise storing, in a memory of the computerized device, an image document (e.g., a scanned-in document or a digital photograph). The image document can be accessed and processed, by a processor of the computerized device, in order to create an obfuscated document (i.e., a document that is rendered unclear, unintelligible, etc.). Specifically, processing the image document can comprise analyzing the image document to identify at least one text region and at least one word image contained in the at least one text region. Then, for each word image, the following processes can be performed: resizing the word image so that it is a predetermined size; overlaying the word image with a grid of cells, which has the same predetermined size and which comprises a first number of columns and a second number of rows, such that the cells contain portions of the word image; and using a selected shuffling pattern to shuffle positions of the cells within the grid to move the portions of the word image. Moving the portions of the word image in this manner creates a corresponding scrambled image, wherein the word image is unrecognizable to the human eye and to conventional image document processors. All word images in the image document can be replaced with corresponding scrambled images, thereby generating the obfuscated document. Once the obfuscated document is generated, this method can comprise using a network interface of the computerized device to communicate the obfuscated document to a computer server over a network.

An obfuscated document processing method performed by a server in the same client-server environment can comprise receiving, by a network interface from a client computerized device over a network, an obfuscated document (i.e., a document that is rendered unclear, unintelligible, etc.). As discussed above, the obfuscated document can be created by the client computerized device from an image document, which comprises at least one word image, and the obfuscated document can comprise at least one scrambled image, wherein each scrambled image in the obfuscated document corresponds to a single word image in the image document. This method can further comprise storing (e.g., in a memory) the obfuscated document and then processing the obfuscated document. The process of processing the obfuscated document can be performed by a processor in communication with the memory and can comprise evaluating each specific scrambled image individually to recognize a specific word represented by that specific scrambled image. For example, previously trained software (e.g., a previously trained convolutional neural network (CNN)) can be executed by the processor to evaluate a specific scrambled image in order to recognize the specific word represented by that specific scrambled image in the obfuscated document. Thus, the obfuscated document can be processed and, particularly, subjected text recognition processing without having to reconstruct the image document.

These and other features are described in, or are apparent from, the following detailed description.

BRIEF DESCRIPTION OF THE DRAWINGS

Various exemplary systems, devices and methods are described in detail below, with reference to the attached drawing figures, in which:

FIG. 5 is a table showing a portion of a vocabulary set with multiple different words and each of those different words rendered using multiple different fonts;

DETAILED DESCRIPTION

Figure 1:
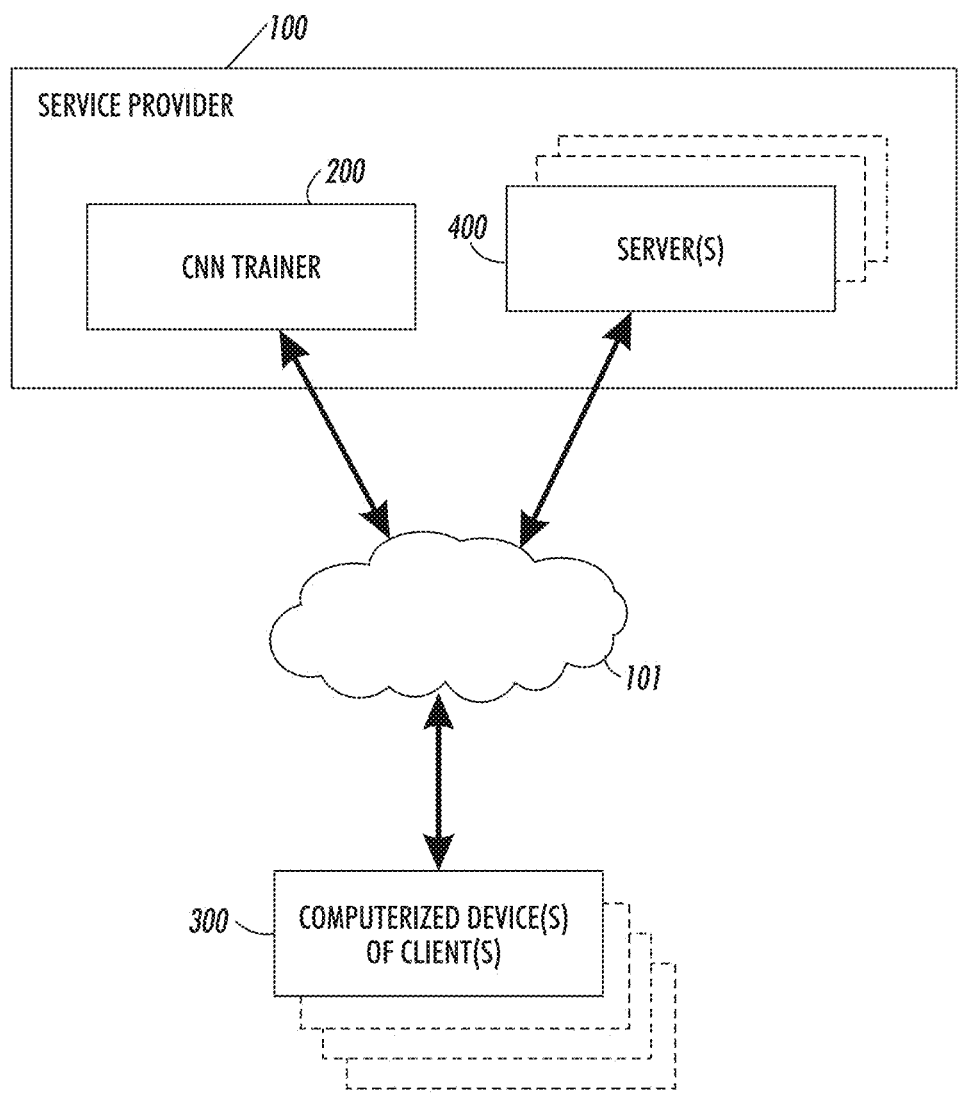
FIG. 1 is a schematic diagram illustrating a client-server image document processing system.

As mentioned above, image document processing and, particularly, text recognition (also referred to herein as optical character recognition (OCR)) is prevalent in many client-server applications, wherein a client uploads an image document to a server for processing. For example, it is used in document process outsourcing for recognition of text in forms, for conversion of handwritten notes to text, etc. One of the challenges associated with these client-server applications is preserving the privacy of the information contained in the recognized text, particularly, when public cloud servers are used. For example, privacy is a serious concern in situations where a public cloud server is used to recognize text in healthcare forms because individuals do not want their privacy violated by server operators and because of privacy laws set forth in the Health Insurance Portability and Accountability Act (HIPAA). Privacy is also a serious concern in situations where a public cloud server is used to convert handwritten notes to text, depending upon the nature of the hand written text. Risks associated with potential of hacking of either servers that maintain stored copies recognized text and/or with potential hacking of communication channels used to transmit image documents to servers also raise privacy concerns.

Solutions for preserving the privacy of recognized text in a client-server environment can include, for example, obfuscation or encryption. Obfuscation schemes attempt to preserve privacy by removing and/or blurring portion(s) of the recognize text that could potentially identify individual(s) and, thereby violate privacy. For example, prior to transmitting the image document to a server for text recognition processing, the client removes or blurs portion(s) of identification numbers, such as a Social Security Number (SSN), or dates of birth (DOB). However, such obfuscation schemes are not entirely privacy-preserving because some portion(s) of the identifying information is still transmitted to the server. Encryption schemes attempt to preserve privacy by converting the image document to a cipher prior to transmitting the image document to a server for text recognition processing. The cipher cannot be deciphered by unauthorized parties that do not share the private encryption key. Thus, these encryption schemes provide for security against privacy violations that may occur due to hacking of the channel on which the image document is transmitted, the image document is still decrypted on the server and, thereby subject to privacy violations.

In view of the foregoing disclosed herein are devices and methods for processing an image document in a client-server environment such that privacy of text information contained in the image document is preserved. Specifically, in a client-server environment, an image document can be processed using a local computerized device of a client to create an obfuscated document (i.e., a document that is rendered unclear, unintelligible, etc.) by identifying word images in the image document and scrambling those word images. The obfuscated document can be received by a server of a service provider over a network (e.g., the Internet) and processed by previously trained software (e.g., a previously trained convolutional neural network (CNN)) to recognize specific words represented by the scrambled images in the obfuscated document and, thereby perform text recognition without having to reconstruct the image document. Since the image document is neither communicated over the network, nor reconstructed and stored on the server, privacy concerns are minimized.

Figure 3:
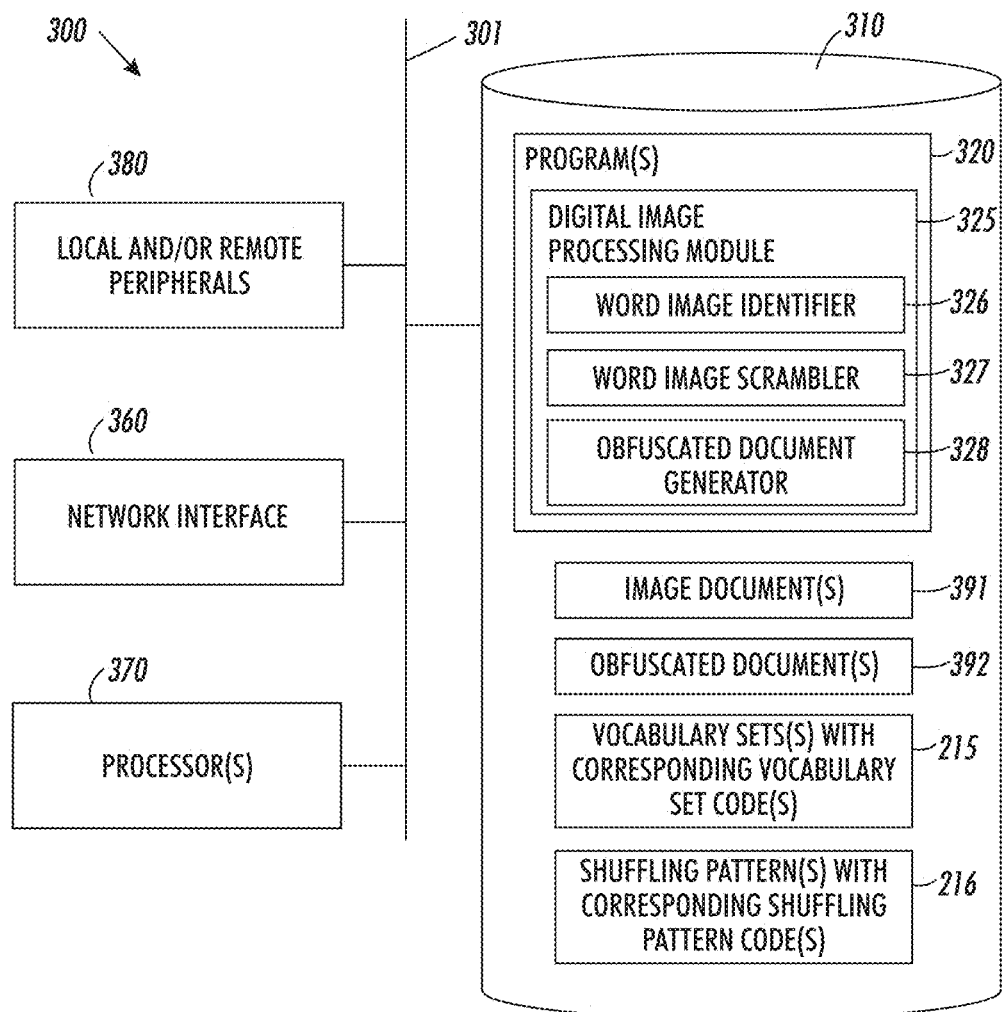
FIG. 3 is a schematic diagram illustrating an exemplary client computerized device that can be incorporated into the system of FIG. 1.
Figure 4:
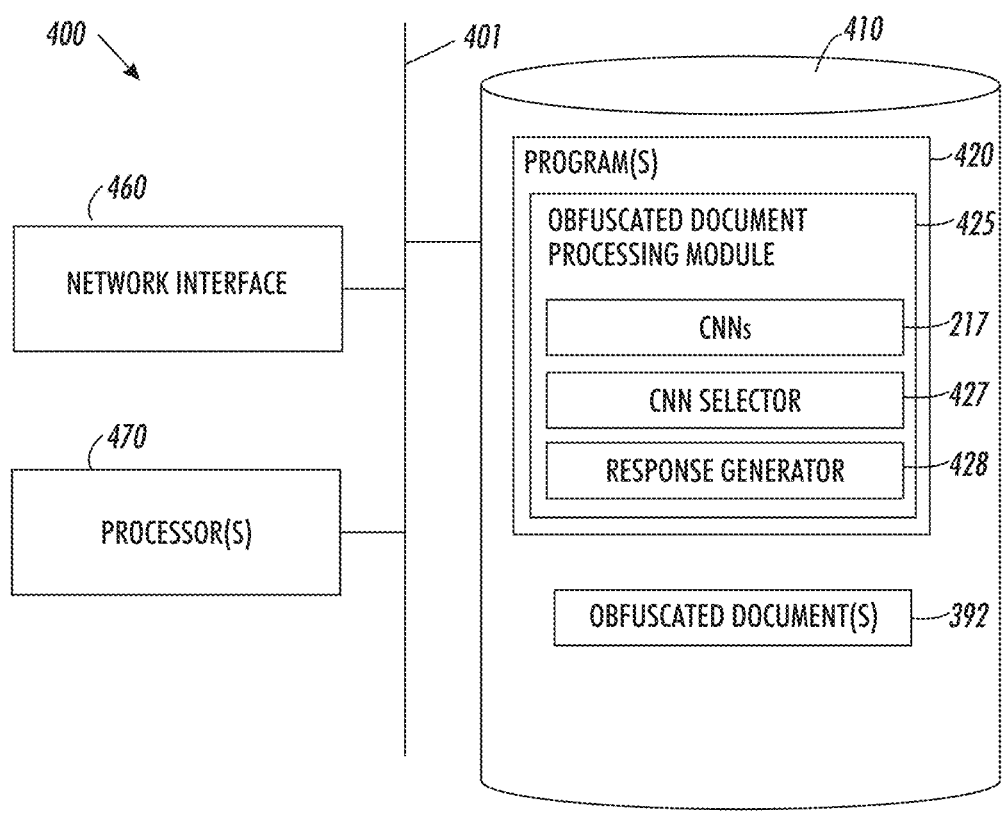
FIG. 4 is a schematic diagram illustrating an exemplary server that can be incorporated into the system of FIG. 1.

More particularly, referring to FIG. 1, disclosed herein is a client-server image document processing system. The client-server image document processing system can be managed by an application service provider (ASP) 100, which operates one or more servers 400 that are in communication with one or more computerized devices 300 of one or more clients over a wide area network 101 (e.g., the Internet). The APS 100 can also operate at least one additional computerized device for convolutional neural network (CNN) development (i.e., a CNN developer 200). The CNN developer 200 can be in communication with the server(s) 400 and the computerized device(s) 300 of the clients (e.g., over the WAN 101). As described in greater detail below, FIGS. 2, 3 and 4 are schematic drawings illustrating an exemplary CNN developer 200, an exemplary client computerized device 300 and an exemplary ASP server 400, respectively, which can be incorporated into the disclosed client-server environment.

Figure 2:
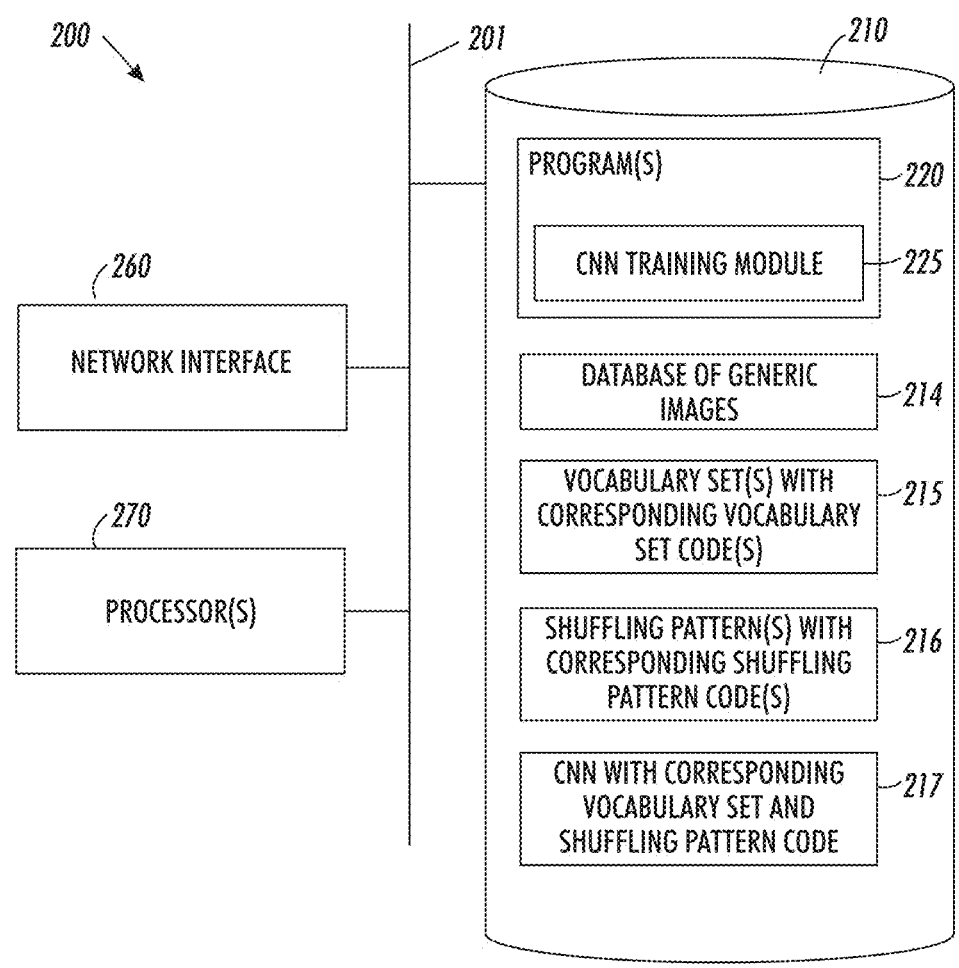
FIG. 2 is a schematic diagram illustrating an exemplary CNN developer that can be incorporated into the system of FIG. 1.

Referring to FIG. 2, setup of the client-server image document processing system begins with the development of trained convolutional neural networks (CNNs) by the CNN developer 200. The CNN developer 200 can comprise a memory 210, a network interface 260 for communicating over the WAN 101 and at least one processor 270. These components can be in communication and operably connected over a wired network 201 (e.g., a system bus) or a wireless network (not shown).

The memory 210 (e.g., at least one computer readable storage medium, such as a computer readable storage device) can store at least one vocabulary set 215 and at least one large diverse database of generic images 214. Each vocabulary set 215 can comprise some number (e.g., 100; 1000; 10,000; etc.) of images of words, wherein each different word is rendered multiple times using some number (e.g., 5; 10; 20; etc.) of different fonts (e.g., Times New Roman, Courier, Brushed Script, Bradley Hand, Impact etc.). For example, FIG. 5 is a table showing a portion of a vocabulary set with multiple different words and each of those different words rendered using different fonts. It should be noted that each of the words in the vocabulary set shown in FIG. 5 is further associated with a corresponding identifier (e.g., an output class number (OCN)) that identifies that specific word within that specific vocabulary set. Each vocabulary set 215 stored in the memory 210 can be received from a client and can contain a set of vocabulary words, which would typically be contained in any image documents submitted by the client to the ASP 100 for text recognition processing. Alternatively, each vocabulary set 215 stored in the memory 210 can be created by the ASP 100 and can contain commonly used words. Alternatively, the vocabulary sets 215 stored in the memory 210 can comprise a combination of both client-provided vocabulary sets and ASP-created vocabulary sets. In any case, each vocabulary set 215 stored in the memory 210 can be associated with a corresponding identifier (i.e., a corresponding vocabulary set code (VSC)) that identifies the vocabulary set and assumes a given word order within the set (e.g., alphabetical order). Optionally, for added security as discussed in greater detail below, multiple instances of the same vocabulary set could be stored in the memory 210, where the word order varies between the multiple instances (referred to herein as text maps), where each word in the text map is associated with an output class number (OCN) and where each text map is associated with a corresponding identifier (referred to herein as a text map code (TMC)) that identifies the specific vocabulary set/word order combination.

The memory 210 can further store a set of shuffling patterns 216. Each shuffling pattern 216 can be generated randomly for a grid of cells with a predetermined granularity (i.e., with predetermined first number X of columns and a predetermined second number Y of rows) and a predetermined size (i.e., with a predetermined overall width W and height H). Additionally, each shuffling pattern 216 can be associated with a corresponding identifier (i.e., a shuffling pattern code (SPC)) that identifies that specific shuffling pattern. For purposes of this disclosure, a shuffling pattern refers to a mapped pattern that is randomly generated and used to shuffle cells within the grid (i.e., used to scramble or move cells within the grid to different locations within the grid).

The memory 210 can further store program(s) of instruction 220 including, but not limited to, a program of instructions for developing and training convolutional neural networks (CNNs) (see the CNN development module 225). For purposes of this disclosure, the trained convolutional neural networks (CNNs) are software program developed and trained to recognize text from scrambled images and, specifically, to recognize a specific word from a scrambled image of a word image (i.e., of an image of the specific word) and to do so without having to reconstruct the word image. Each CNN is a machine-learning algorithm (i.e., a trainable algorithm) and, particularly, a variation of a multilayer perceptron and, more particularly, a feed-forward artificial neural network inspired by biological processes (see more detailed discussion of CNNs below).

In the embodiments disclosed herein, the processor 270 can execute the CNN development module 225 in order to develop and train CNNs for recognizing words in scrambled images, wherein each trained CNN is initially developed using the large diverse database of generic images 214 and then fine-tuned (i.e., further adapted) using scrambled word images acquired by scrambling words in a selected vocabulary set 215 (or, if applicable, a selected text map for a selected vocabulary set) using a selected shuffling pattern 216 such that the resulting CNN (i.e., the trained CNN) can recognize the scrambled word images. It should be noted that the database of generic images 214 can comprise, for example, the ImageNet database. Those skilled in the art will recognize that the ImageNet database s a large database of generic images that is organized according to the WordNet hierarchy, in which each node of the hierarchy is depicted by hundreds and thousands of images, and that was build at Stanford University (See http://www.image-net.org/ and http://image-net.org/explore, ©2014 Stanford Vision Lab, Stanford University, Princeton University).

Figure 6:
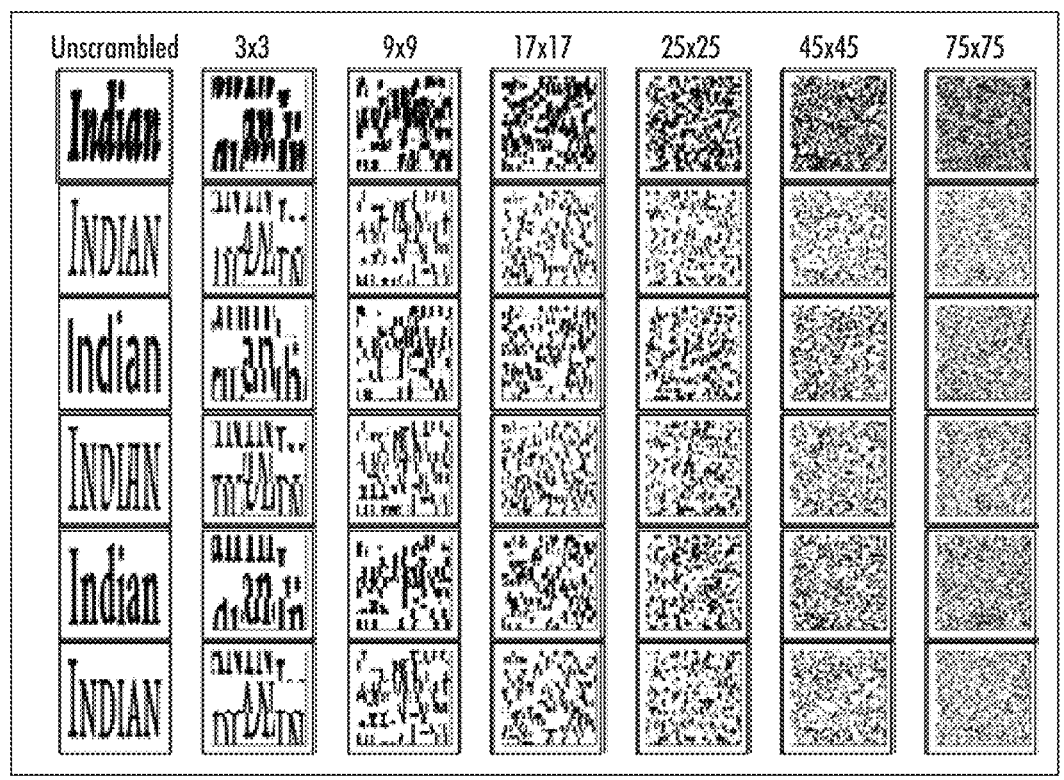
FIG. 6 is a table showing multiple same size word images of a single word rendered in different fonts and scrambled using progressively greater scrambling granularities or grid sizes.

More specifically, this process of developing a trained CNN for recognizing words in scrambled images begins with initially training the CNN based on images in a large diverse database of generic images 214 (e.g., the ImageNet database). Then, the images of the words in the selected vocabulary set 215 (or, if applicable, the selected text map for the selected vocabulary set) can be scrambled using the selected shuffling pattern 216. Specifically, the following processes can be performed with respect to each word in the selected vocabulary set: resizing the word so that it is the same predetermined size as the grid of cells associated with the selected shuffling pattern; overlaying the word with the grid of cells; and applying the selected shuffling pattern to shuffle the positions of the cells within the grid and, thereby to move portions of the word (i.e., to scramble the word). Those skilled in the art will recognize that the greater the level of granularity of the grid (i.e., the greater the first number X of columns and the greater the second number Y of rows) overlaying a word having the same predetermined size as the grid, the more likely the resulting scrambled image will be unrecognizable to the human eye. For example, FIG. 6 illustrates multiple same size word images of a single word (namely, "Indian") rendered in different fonts and scrambled using progressively greater scrambling granularities or grid sizes (i.e., unscrambled, 3×3 grid, 9×9 grid, 17×17 grid, 25×25 grid, 45×45 grid, and 75×75 grid). As illustrated, increasing the first number X of columns and/or the second number Y of rows in the grid (i.e., increasing the level of granularity) makes it impossible for a human to recognize the word "Indian" from the resulting scrambled image. Furthermore, increasing the level of granularity also makes it unlikely that the resulting scrambled image will be recognizable by a machine without using a trained CNN developed as disclosed herein. These scrambled images can then be used to further adapt (i.e., fine-tune) the CNN so that the resulting CNN (i.e., the trained CNN) is trained to recognize words in scrambled images.

More specifically, those skilled in the art will recognize that in image document processing image documents differ from other input data in that the 2-dimensional topology of the pixels is meaningful and can be exploited. The image document input data is often very high dimensional. For example, a 255×255 RGB image has 195075 pixel values. Additionally, invariance to factors such as illumination changes, translations, scaling etc. is desirable in an image document processing system and it is undesirable for an image document processing system to identify an object differently in different lighting conditions. Convolutional neural networks (CNNs) have been developed to address some of these issues in the digital processing environment.

For example, with regard to local connectivity, unlike in multi-layer perceptrons (MLPs), neurons in a CNN are not connected to all neurons in the previous layer or all pixels in the input image. Every neuron receives input from only a small patch of the image or only a small number of neurons from the previous layer. This is called the receptive field of the neuron. For example, a neuron connected only to a 3×3 patch of the input image has a receptive field size of 9.

With regard to parameter sharing, neurons in a CNN are grouped into feature maps. Neurons in the same feature map have the same set of input weights. For example, if the receptive field of a neuron is 3×3, then all neurons in the same feature map have the same set of 9 weights i.e. they share these parameters. These 9 weights can be arranged in a 3×3 matrix called kernel or filter. Neurons in the same feature map are connected to different (often overlapping) patches of input image or neurons from the previous layer. A feature map can hence be thought of as a detector for a particular feature. Each neuron of the feature map is looking for the same feature but at different locations in the input image. Different feature maps are detecting different features. Feature maps are often represented in 2-D where the neurons are arranged according to the spatial closeness of their receptive fields. A CNN consists of multiple layers of feature extraction. At each layer, there are multiple feature maps, which extract different features. The activations of these feature maps serve as the input to the next layer of feature maps.

With regard to the convolution operation, during the forward propagation, the activations of the neurons in a feature map are the sum of convolution of the kernel of that feature map with the feature maps of the previous layer (or channels of the input image). These layers are called convolution layers or filter-bank layers. The convolution operation is followed by a non-linearity function, such as rectified linear unit (ReLU) function, sigmoid or tan h, expressed mathematically, as follows:

$$y_j = f(\Sigma_i k_{ij} * x_i), \quad (1)$$

where $y_j$ is the $j^{th}$ feature map, $k_{ij}$ is the convolution kernel of the $i^{th}$ feature map for the $i^{th}$ feature map of the previous layer (or input image channel), $x_i$ is the $i^{th}$ feature map of the previous layer (or the $i^{th}$ image channel) and $f$ is the activation function. A CNN hence uses multiple layers of filters, learned in a data-driven fashion, to extract features describing the input. The convolutional layers are often interspersed with pooling layers to reduce computational time and to introduce some spatial invariance. The convolutional layers are followed by a few fully-connected layers that allow the CNN to learn distributed feature representations. A classifier layer such as a softmax layer follows the fully-connected layers.

Recent advancements in hardware capability have made it possible to learn CNNs with a large number of layers. Such 'deep' architectures learn hierarchies of features. The lower layers are more generic features (such as edges) while the higher layers use these to represent more discriminative templates for recognition. These new generation deep CNNs have achieved state of the art results on various object recognition and detection datasets.

Figure 7:
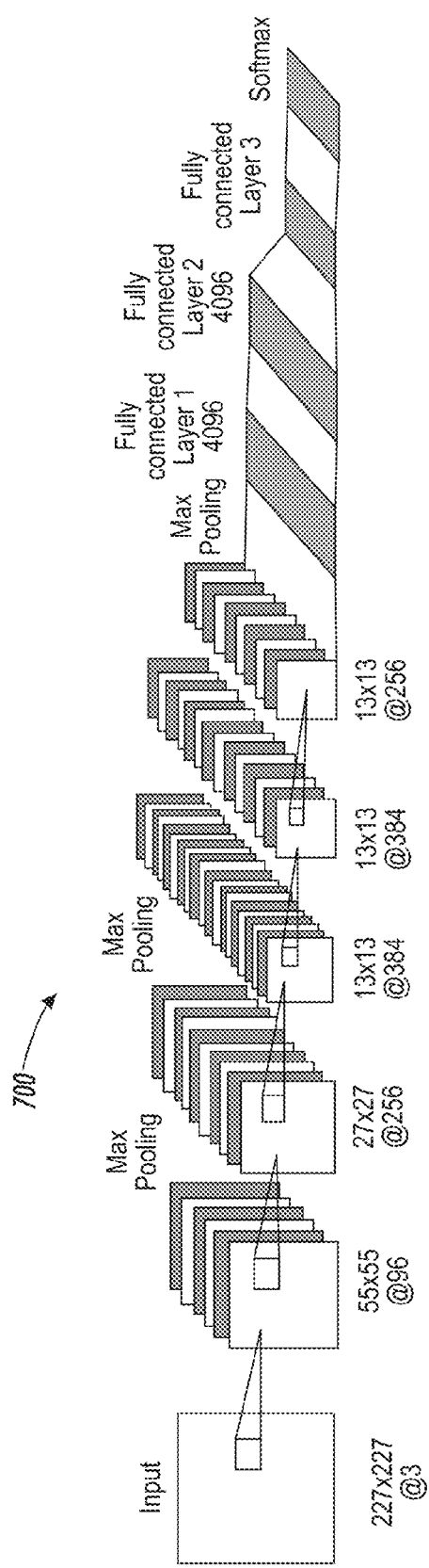
FIG. 7 is a diagram illustrating an exemplary CNN architecture.

FIG. 7 depicts an exemplary CNN architecture 700 that can be trained as described above in order to develop a CNN and, particularly, a trained CNN for recognizing words in scrambled images. This CNN architecture 700 comprises eight learned layers including five convolutional layers and three fully-connected layers. The input to the CNN is a 3 channel image of size 227×227×3. The first convolutional layer filters the input patch with 96 kernels of size 11×11×3 with a stride of 4 pixels. The second convolutional layer takes as input the pooled and contrast normalized output of the first convolutional layer and filters it with 256 kernels of size 5×5×96. The third convolutional layer has 384 kernels of size 3×3×256, while the fourth and the fifth convolutional layers have 384 and 256 kernels of size 3×3×384 respectively. The first two fully-connected layers have 4096 neurons each. All the max-pooling layers are of size 3×3 with a stride of 2. A max-pooling layer follows the convolutional layers 1, 2 and 5. A contrast normalization layer follows the pooling layers 1 and 2. Rectified linear unit (ReLU) non-linearity is applied to the output of every convolutional and fully-connected layer.

The convolutional kernels learned at the early stages of the CNN training process represent the low-level information in the scrambled images, but do not represent the word images (i.e., do not provide for word recognition). Thus, the knowledge learned by the lower levels of the CNN must be preserved and the classification layers must be retrained to address the problem of word recognition in a process called "adaptation" of the CNN. Those skilled in the art will recognize that CNN adaptation features extracted from CNNs are surprisingly generic. CNNs that are trained using a large diverse database of generic images 214 (e.g., the ImageNet database) can be used as e☐ective black-box feature extractors. This is because activations of the penultimate fully-connected layer from such an 'o☐-the-shelf CNN' when used as features for a linear SVM give state-of-the-art results for a wide variety of vision tasks. It should be noted that the performance of adaption on a new task can be further increased by fine-tuning the CNN with a new dataset. Typically, the classification layer of the CNN is removed as it is specific to the pre-training task and a new randomly initialized classification layer with the desired number of output units is appended in its place. This new layer is trained with a higher learning rate as compared to the lower layers to prevent clobbering the CNNs initialization. Fine-tuning helps retain the useful low-level feature extractors learned earlier by the CNN while at the same time updates the higher layers making them more discriminative for the new task.

Thus, in order to specifically adapt the CNN being trained to recognize words in scrambled images, the softmax layer of that CNN is replaced with a neuron classification layer that has given number Z of neurons, where Z is equal to the number of words in the specific vocabulary set and where each neuron is assigned a specific output class number associated with a specific word in the specific vocabulary set. Since the class labels are reset, the weights for the final fully-connected layer can be randomly initialized from a normal distribution with 0 mean and 0.01 standard deviation. Training can be carried out using stochastic gradient descent by back-propagating the error from the new classification task. A high learning rate (~0.1) can be assigned for the classification layers and a low learning rate (~0.02) can be assigned for the convolutional layers in order to ensure that the adaptation does not excessively modify the low-level filters that were previously learned. Those skilled in the art will recognize that, as the level of granularity of the grid increases (i.e., as the first number X of columns and the second number Y of rows in the grid increase), the CNN for recognizing a scrambled image in the grid takes more iterations and thereby more training time to reach steady state (i.e., to stabilize) because the distortion function to be learned becomes increasingly complex. Thus, for example, CNN for recognizing an unscrambled image or a scrambled image in a 3×3 grid may take 20,000 iterations and approximately 11 hours to stabilize, a CNN for recognizing a scrambled image in 15×15 grid may take 30,000 iterations to stabilize and a CNN for recognizing a scrambled image in a 75×75 grid may take 60,000 iterations and approximately 27 hours to stabilize.

Each CNN 217 (i.e., each trained CNN) developed by the CNN developer 200 can be stored locally on the memory 210 and can be associated in the memory 210 with both the specific vocabulary set code (VCS) of the specific vocabulary set (or, if applicable, the specific TMC of the specific text map) used to develop that CNN and the specific shuffling pattern code (SPC) of the specific shuffling pattern used to develop that CNN.

Setup of the client-server image document processing system can further comprise transmitting the CNNs 217 (i.e., the trained CNNs) to the server(s) 400. Specifically, each specific trained CNN and both the specific vocabulary set code (VCS) of the specific vocabulary set (or, if applicable, the specific text map code (TMC) of the specific text map) used to develop that CNN and the specific shuffling pattern code (SPC) of the specific shuffling pattern used to develop that CNN can be communicated (e.g., over the network 101) to the server(s) 400.

Set up of the client-server image document processing system can further comprise transmitting the vocabulary sets 215 (or, if applicable, the text maps for the vocabulary sets) and the multiple shuffling patterns 216 to the computerized device(s) 300 of the client(s). Specifically, each specific vocabulary set (or, if applicable, each text map for each specific vocabulary set), including the output class numbers associated with each word contained therein and the specific vocabulary set code (VCS) for the specific vocabulary set (or, if applicable, the specific TMC for the specific text map) can be transmitted to the computerized device(s) 300 of the client(s). Additionally, each specific shuffling pattern and the specific shuffling pattern code (SPC) for the specific shuffling pattern can be transmitted to the computerized device(s) 300 of the client(s).

Following the set-up of the client-server image document processing system, the computerized device(s) 300 of the clients can generate and submit, to the server(s) 400, image document processing requests and, particularly, text recognition requests and the server(s) 400 can process those requests, as described below.

More specifically, referring to FIG. 3, each client computerized device 300 can comprise any computerized device having processing capability suitable for the image document processing including, but not limited to, desktop computers, laptop computers, tablet computers, smart phones, etc. In any case, each client computerized device 300 can comprise at least a memory 310, a network interface 360 for communicating over the WAN 101, one or more local or remote peripheral devices 380 (e.g., digital cameras, scanners, etc.), and at least one processor 370. The above-described components can be in communication and operatively connected over a wired network 301 (e.g., a system bus) and/or a wireless network (not shown).

The memory 310 (e.g., at least one computer readable storage medium, such as a computer readable storage device) can store one or more image documents 391. Each image document 391 can be, for example, received through a peripheral 380 or any other suitable source. For example, an image document can be a document scanned into the computerized device 300 by a scanner, a digital photograph taken by a digital camera on the computerized device 300, a digital photograph taken by a remote digital camera and uploaded to the computerized device, an image document received by the computerized device through an email or downloaded from some other device, etc.

The memory 310 can further store vocabulary sets 215 (or, if applicable, text maps for each of the vocabulary sets) and a set of shuffling patterns 216 received from the CNN developer 200. Specifically, the memory 310 can store each specific vocabulary set (or, if applicable, each specific text map associated with each specific vocabulary set), including the output class numbers associated with each word contained therein and the specific vocabulary set code (VCS) for the specific vocabulary set (or, if applicable, the specific TMC for the specific text map). Additionally, the memory 310 can store a set of shuffling patterns 217, where each specific shuffling pattern is defined and associated with a specific shuffling pattern code (SPC).

The memory 310 can further store program(s) of instruction 320 including, but not limited to, a program of instructions for processing an image document (i.e., an image document processing module 325). The image document processing module 325 can comprise instruction portions for identifying word images within an image document (i.e., a word image identifier 326), for scrambling word images (i.e., a word image scrambler 327) and for generating an obfuscated document (i.e., an obfuscated document generator 328).

The processor 370 can execute the image document processing module 325 and, particularly, the various instruction portions mentioned above in order to create an obfuscated document 392 (i.e., a document that is rendered unclear, unintelligible, etc.) from a selected image document 391. Specifically, the processor 370, executing the word image identifier 326, can analyze the selected image document 391 to identify at least one text region within that image document 391 and to further identify at least one word image contained in the at least one text region (i.e., to segment the text region into words). Techniques for analyzing an image document to identify text regions and to segment the text regions into words are well known in the art and, thus, the details of such techniques are omitted from this specification in order to allow the reader to focus on the salient aspects of the disclosed system. The processor 370, executing the word image scrambler 327, can then perform the following for each identified word image: randomly select one of the shuffling patterns (i.e., a selected shuffling pattern) from the set of shuffling patterns; resize the word image so that it has the same predetermined size as the grid of cells, which is associated with the selected shuffling pattern; overlay the word image with the grid of cells that is associated with the selected shuffling pattern such that the cells contain portions of the word image; and, shuffle the positions of the cells within the grid according to the selected shuffling pattern in order to move the portions of the word image contained in the cells. Moving the portions of the word image in this manner creates a corresponding scrambled image, wherein, as discussed above, the level of granularity of the grid ensures that the word in the scrambled word image is unrecognizable to the human eye and to conventional image document processors. The processor 370, executing the obfuscated document generator 328, can then replace all word images in the selected image document 391 with corresponding scrambled images (created as described above), thereby generating the obfuscated document 392. Any obfuscated documents 392 created in this manner can be stored in memory 310. Additionally, once an obfuscated document 392 is generated, the network interface 360 can communicate the obfuscated document 392 to a computer server 400 over the WAN 101 with a request for processing.

By communicating such an obfuscated document 392 instead of the image document 391 to the server 400, the client-server image document processing system disclosed herein minimizes risks associated with potential hacking of communication channels used for communication between the client computerized device 300 and the server 400.

Referring to FIG. 4, each server 400 can comprise at least a memory 410, a network interface 460 for communicating over the WAN 101, and at least one processor 470. The above-described components can be in communication and operatively connected over a wired network 401 (e.g., a system bus) and/or a wireless network (not shown).

The memory 410 can store program(s) of instruction 420 including, but not limited to, a program of instructions for processing an obfuscated document (i.e., an obfuscated document processing module 425). The obfuscated document processing module 425 can comprise instruction portions for recognizing words from scrambled image (i.e., multiple CNNs 217), for selecting one of the CNNs (i.e., a CNN selector 427) and for generating a response to a processing request from a client computerized device 300 (i.e., a response generator). It should be noted that each CNN 217 is stored in the memory 410 so that it is associated with a specific vocabulary set code (VCS) for a specific vocabulary set (or, if applicable, a specific TMC for a specific text map) used to develop that specific CNN and with a specific shuffling pattern code (SPC) for the specific shuffling pattern used to develop that specific CNN.

The network interface 460 can receive an obfuscated document 392 from a client computerized device 300 over the WAN 101 and the memory 410 can store that obfuscated document 392. As discussed above, the obfuscated document 392 can be created by the client computerized device 300 from an image document 391, which comprises at least one word image, and the obfuscated document 392 can comprise at least one scrambled image, wherein each scrambled image in the obfuscated document corresponds to a single word image in the image document 391.

The processor 470 can execute the obfuscated document processing module 425 and, particularly, the various instruction portions thereof to evaluate each specific scrambled image within the obfuscated document individually in order to recognize a specific word represented by that specific scrambled image without having to reconstruct the scrambled image. Specifically, for each specific scrambled image in the obfuscated document, the processor 470, executing the CNN selector 427, can first select one of the CNNs (i.e., one of the trained CNNs) to evaluate the specific scrambled image.

In one embodiment, each scrambled image in the obfuscated document can be associated with a specific vocabulary set code (or, if applicable, a specific TMC) and a specific shuffling pattern code and the processor 470, executing the CNN selector 427, can select the specific trained CNN to evaluate the specific scrambled image based on those codes. More specifically, as mentioned above during discussion of CNN development by the CNN developer 200, each trained CNN is initially developed using a large diverse database of generic images 214 and then fine-tuned (i.e., further adapted) using scrambled word images acquired by scrambling words from a selected vocabulary set 215 (or, if applicable, a selected text map for a selected vocabulary set) using a selected shuffling pattern 216 such that the resulting CNN (i.e., the trained CNN) can recognize scrambled word images. In this embodiment, each CNN 217 can be stored in the memory 410 so that it is associated with a specific vocabulary set code (VCS) for a specific vocabulary set (or, if applicable, a specific TMC for a specific text map) and the processor 470 can select the CNN accordingly.

Alternatively, the CNN selector 427 can be trained to recognize vocabulary sets and shuffling patterns given the scrambled images. In this case, the processor 470, executing the CNN selector 427, can evaluate the specific scrambled image to recognize the specific vocabulary set and the specific shuffling pattern and can then select the specific trained CNN to further evaluate the specific scrambled image based on the specific vocabulary set and the specific shuffling pattern.

In any case, once the trained CNN is selected, the processor 470 can execute the selected trained CNN to produce a specific output class number for the specific scrambled image. Since each word in each vocabulary set (or, if applicable, in each text map) is associated with a corresponding output class number, the results of this evaluation process can be used to identify (i.e., recognize) the specific word represented by the scrambled image. It should be noted that since, as discussed above with regard to the CNN developer 200, each vocabulary set comprises not only multiple different words and multiple instances of each of the different words depicted in different fonts, recognition of the specific word can be made regardless of the font used. Additionally, it should be noted that, as the level of granularity of the grid used for shuffling word images using a specific shuffling pattern increases (i.e., as the first number X of columns and the second number Y of rows in the grid increase), the recognition accuracy of CNNs, which are fine-tuned based on images scrambled using that shuffling pattern will decrease. However, the recognition accuracy will still remain relatively high. For example, the recognition accuracy may be over 95% (e.g., 96.4%) for CNNs, which are fine-tuned based on scrambled images scrambled according to specific shuffling pattern associated with a 3×3 grid, and at or above 90% for CNNs, which are fine-tuned based on scrambled images that were scrambled according to a specific shuffling pattern associated with a 75×75 grid.

Subsequently, the processor 470, executing the response generator 428, can generate a response that indicates, for each specific scrambled image in the obfuscated document, the specific vocabulary set code (or, if applicable, the specific TMC) associated with the selected CNN used to evaluate the specific scrambled image and the specific output class number acquired for that specific scrambled image by the selected CNN. This response can be communicated by the network interface 460 to the client computerized device 300 over the WAN 101.

The network interface 360 of the client computerized device 300 can receive the response. Then, processor 370 of the client computerized device 300 can find the words represented by the scrambled images in the obfuscated document using the information contained in the response. Specifically, for each specific scrambled image in the obfuscated document, the processor 370 can perform the following: access the specific vocabulary set indicated by the specific VCS (or, if applicable, the specific text map indicated by the specific TMC) that was referenced in the response; find the specific output class number referenced in response in the specific vocabulary set (or, if applicable, in the specific text map); and read out the specific word associated with that specific output class number and represented by the specific scrambled image.

By avoiding reconstruction and storage of the image document on the server 400 and by further only communicating the specific output class number acquired for each scrambled image back to the client computerized device 300, the client-server image document processing system disclosed herein further minimizes risks associated with potential hacking of the server 400 or the communication channels used for communication between the client computerized device 300 and the server 400.

Figure 8A:
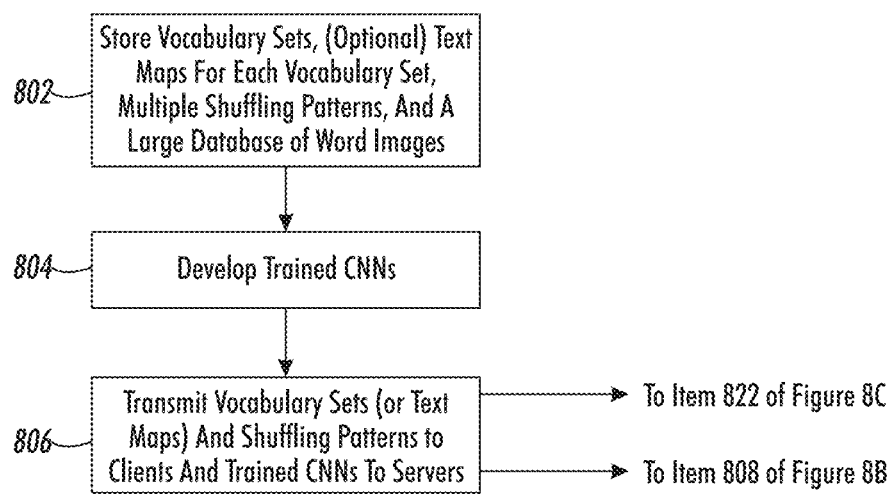
FIGS. 8A-8C are flow diagrams illustrating method steps performed by a CNN developer, a client computerized device and a server in a client-server image document processing environment.
Figure 8B:
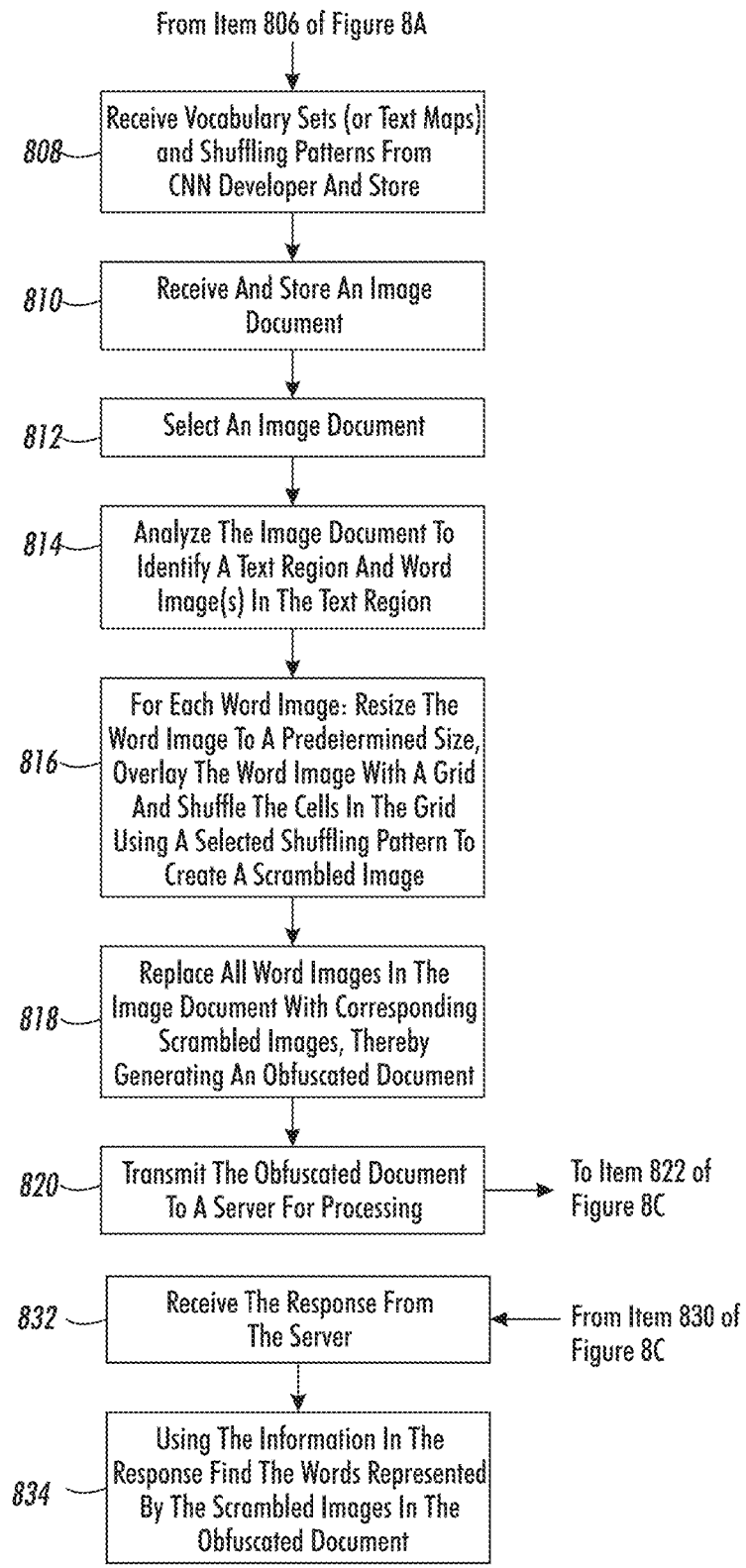
Figure 8C:
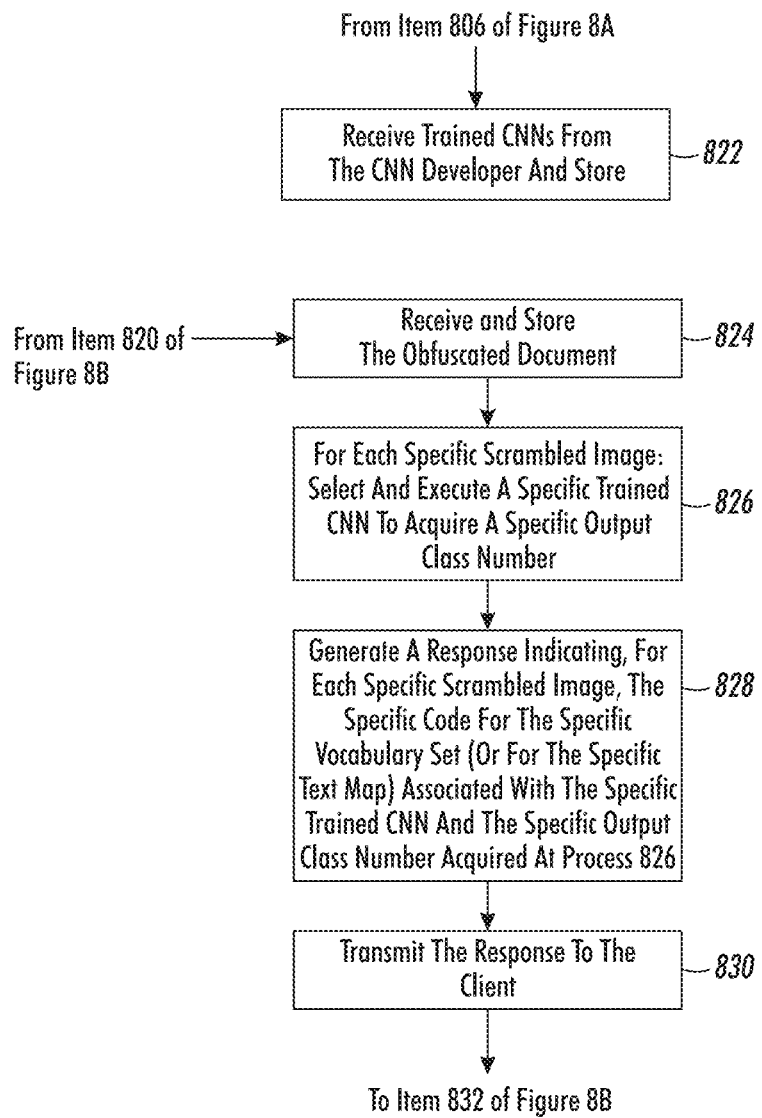

Referring to FIGS. 8A-8C, also disclosed herein are methods of performing various functions in a client-server image document processing environment, as discussed in detail above and illustrated in FIG. 1, including a method for developing a trained convolutional neural network (CNN) for recognizing words from scrambled images (see FIG. 8A), a method for processing an image document into an obfuscated document (see FIG. 8B), and a method for processing an obfuscated document using selected CNNs to recognize words from scrambled images contained in the obfuscated document (see FIG. 8C).

Referring to FIG. 8A, as discussed in greater detail above, setup of the client-server image document processing environment can begin in the CNN developer 200 of FIG. 2 with the storage of multiple vocabulary sets 215 or, optionally, multiple text maps for each vocabulary set; multiple shuffling patterns 216; and a large diverse database of generic images 214 (802).

Each vocabulary set 215 can comprise some number (e.g., 100; 1000; 10,000, etc.) of images of words, wherein each different word is rendered multiple times using some number (e.g., 5; 10; 20; etc.) of different fonts (e.g., Times New Roman, Courier, Brushed Script, Bradley Hand, Impact etc.). Additionally, each of the words in each vocabulary set can be associated with a corresponding identifier (e.g., an output class number (OCN)) that identifies that specific word within that specific vocabulary set. Each vocabulary set 215 can further be associated with a corresponding identifier (i.e., a corresponding vocabulary set code (VSC)) that identifies the vocabulary set and assumes a given word order within the set (e.g., alphabetical order).

Alternatively, multiple instances of the same vocabulary set could be stored in the memory 210, where the word order varies between the multiple instances (referred to herein as text maps), where each word in each text map is associated with a corresponding identifier (e.g., an output class number (OCN)) and where each text map is associated with a corresponding identifier (referred to herein as a text map code (TMC)) that identifies the specific vocabulary set/word order combination.

Each shuffling pattern 216 can be randomly generated for a grid of cells with a predetermined granularity (i.e., with predetermined first number X of columns and a predetermined second number Y of rows) and a predetermined size (i.e., with a predetermined overall width W and height H). Additionally, each shuffling pattern 216 can be associated with a corresponding identifier (i.e., a shuffling pattern code (SPC)) that identifies that specific shuffling pattern. For purposes of this disclosure, a shuffling pattern refers to a randomly generated pattern used to shuffle cells within a grid of cells (i.e., used to scramble or move cells within a grid to different locations within the grid).

Next, trained convolutional neural networks (CNNs) for recognizing words from scrambled images can be developed (e.g., by a processor 270 of the CNN developer 200 of FIG. 2 executing a CNN development module 225 stored in memory 210) (804). Specifically, at process 804, development of a trained CNN begins with initially developing the CNN using the large diverse database of generic images 214 and then fine-tuning (i.e., further adapting) the CNN using scrambled word images acquired by scrambling words from a selected vocabulary set 215 (or, if applicable, a selected text map for a selected vocabulary set) using a selected shuffling pattern 216. It should be noted that the database of generic images 214 can comprise, for example, the ImageNet database. Those skilled in the art will recognize that the ImageNet database is a large generic image database that is organized according to the WordNet hierarchy, in which each node of the hierarchy is depicted by hundreds and thousands of images, and that was build at Stanford University (See http://www.image-net.org/ and http://image-net.org/explore, ©2014 Stanford Vision Lab, Stanford University, Princeton University).

More specifically, at process 804, a CNN is initially trained based on images in the large diverse database of generic images 214 (e.g., the ImageNet database). Then, each word in the selected vocabulary set (or, if applicable, the selected text map for a selected vocabulary set) is scrambled by performing the following: resizing the word so that it has the same predetermined size as a grid of cells associated with the selected shuffling pattern; overlaying the word with the grid of cells; and applying the selected shuffling pattern to shuffle the positions of the cells within the grid and, thereby move portions of the word (i.e., scramble the word). Those skilled in the art will recognize that the greater the level of granularity of the grid (i.e., the greater the first number X of columns and the greater the second number Y of rows) overlaying a word having the same predetermined size as the grid, the more likely the resulting scrambled image will be unrecognizable to the human eye and to conventional image document processors. These scrambled images can then be used to further adapt (i.e., fine-tune) the CNN so that the resulting CNN (i.e., the trained CNN) is trained to recognize words in scrambled images. As discussed in greater detail above with regard to the CNN developer 200, FIG. 7 illustrates exemplary CNN architecture that can be used to train and fine-tune the CNN in this manner.

In any case, each CNN 217 (i.e., each trained CNN) developed by the CNN developer 200 can be stored locally on the memory 210 and can be associated in the memory 210 with both the specific vocabulary set code (VCS) of the specific vocabulary set (or, if applicable, the specific TMC of the specific text map) used to develop that CNN and the specific shuffling pattern code (SPC) of the specific shuffling pattern used to develop that CNN.

Setup of the client-server image document processing system can further comprise transmitting the trained CNNs 217 to the server(s) 400 and further transmitting the vocabulary sets 215 (or, if applicable, the text maps) and the shuffling patterns 216 to the client computerized device(s) 300 (806). Specifically, each specific trained CNN, the specific vocabulary set code (VCS) of the specific vocabulary set (or, if applicable, the specific TMC of the specific text map) used to develop that trained CNN, and the specific shuffling pattern code (SPC) of the specific shuffling pattern used to develop that trained CNN can be communicated to the server(s) 400 (e.g., by the network interface 260 of the CNN developer 200 over the network 101). Furthermore, specific vocabulary set (or, if applicable, each text map for each specific vocabulary set), including the output class numbers associated with each word contained therein and the specific vocabulary set code (VCS) for that specific vocabulary set (or, if applicable, the specific TMC for the specific text map) can be transmitted to the computerized device(s) 300 of the client(s) (e.g., by the network interface 260 over the network 101). Additionally, each specific shuffling pattern and its corresponding specific shuffling pattern code (SPC) can be transmitted to the computerized device(s) 300 of the clients (e.g., by the network interface 260 over the network 101).

Subsequently, an obfuscated document processing request and, particularly, a text recognition request can be generated and submitted (e.g., by the computerized device 300 to a server 400) and those requests can be processed by the server 400, as described below.

More specifically, referring to FIG. 8B, as discussed in detail above with regard to each computerized device 300 of each client illustrated in FIG. 3, vocabulary sets 215 (or, if applicable, the text maps for each of the vocabulary sets) and a set of shuffling patterns 216 can be received from the CNN developer 200 and stored in memory 310 (808). Specifically, each specific vocabulary set (or, if applicable, each specific text map for each specific vocabulary set), including the output class numbers associated with each word contained therein and the specific vocabulary set code (VCS) for that specific vocabulary set (or, if applicable, the specific TMC for that specific text map) can be received by each computerized device 300 from the CNN developer 200 and stored in the memory 310. Additionally, the set of shuffling patterns 217 and their corresponding shuffling pattern code (SPCs) can be received by each computerized device 300 from the CNN developer 200 can also be stored in memory 310.

One or more image documents 391 can also be received by a computerized device 300 through a peripheral 380 or any other suitable source (810). For example, image document can be a document scanned into the computerized device 300 by a scanner, a digital photograph taken by a digital camera on the computerized device 300, a digital photograph taken by a remote digital camera and uploaded to the computerized device, an image document received by the computerized device through an email or downloaded from some other device, etc. Once received, image documents 391 can be stored in memory 310.

A selected one of the image documents 391 can then be processed (e.g., by the processor 370 of the computerized device 300 executing the various different instruction portions of image document processing module 325) in order to create an obfuscated document (i.e., a document that is rendered unclear, unintelligible, etc.) from the selected image document. Specifically, the selected image document can be analyzed (e.g., by the processor 370 executing the word image identifier 326) to identify at least one text region within that image document and to further identify at least one word image contained in the at least one text region (i.e., to segment the text region into words) (814). Techniques for analyzing an image document to identify text regions and to segment the text regions into words are well known in the art and, thus, the details of such techniques are omitted from this specification in order to allow the reader to focus on the salient aspects of the disclosed system. The, for each identified word image, the following can be performed (e.g., by the processor 370 executing the word image scrambler 327): randomly select one of the shuffling patterns (i.e., a selected shuffling pattern) from the set of shuffling patterns; resize the word image so that it has the same predetermined size as the grid of cells, which is associated with the selected shuffling pattern; overlay the word image with the grid of cells that is associated with the selected shuffling pattern such that the cells contain portions of the word image; and, shuffle the positions of the cells within the grid according to the selected shuffling pattern in order to move the portions of the word image contained in the cells (816). Moving the portions of the word image in this manner creates a corresponding scrambled image, wherein, as discussed above, the level of granularity of the grid ensures that the word in the scrambled word image is unrecognizable to the human eye and to conventional image document processors. Finally, all word images in the selected image document can be replaced with corresponding scrambled images (created as described above) (e.g., by the processor 370 executing the obfuscated document generator 328), thereby generating the obfuscated document (818). Any obfuscated documents 392 created in this manner can be stored in memory 310. Additionally, once an obfuscated document 392 is generated, the obfuscated document 392 can be communicated to a computer server 400 along with a request for processing (e.g., by the network interface 360 of the computerized device 300 over the WAN 101) (820). By communicating such an obfuscated document 392 instead of the image document 391 to the server 400, the client-server image document processing system disclosed herein minimizes risks associated with potential hacking of communication channels used for communication between the client computerized device 300 and the server 400.

Referring to FIG. 8C, as discussed in detail above with regard to each server 400 illustrated in FIG. 4, the trained CNNs 217 that were developed by the CNN developer 200 can be received by the server(s) 400 and stored in memory 410 (822). Each trained CNN can be stored such that it is associated with a specific vocabulary set (or, if applicable, a specific text map for a specific vocabulary set) and a specific shuffling pattern.

Upon receipt by a server 400 of an obfuscated document 392 from a client computerized device 300 over the WAN 101 (and, particularly, by a network interface 460 of the server 400), the obfuscated document 392 can be stored in memory 410 (824). As discussed above, such an obfuscated document 392 can be created by a client computerized device 300 from an image document 391, which comprises at least one word image, and the obfuscated document 392 can comprise at least one scrambled image, wherein each scrambled image in the obfuscated document corresponds to a single word image in the image document 391.

Next, the obfuscated document 392 can be processed in order to recognize obfuscated text contained therein. Specifically, each specific scrambled image within the obfuscated document can be evaluated individually (e.g., by a processor 470 of the server 400 executing various instruction portions of an obfuscated document processing module 425) in order to recognize a specific word represented by that specific scrambled image without having to reconstruct the scrambled image.

For each specific scrambled image in the obfuscated document, a specific trained CNN can be selected from amongst the trained CNNs stored in the memory 410 (e.g., by the processor 470 executing a CNN selector 427) and then the specific scrambled image can be evaluated (e.g., by the processor 470 executing that specific trained CNN) (826). Specifically, in one embodiment, each scrambled image in the obfuscated document can be associated with a specific vocabulary set code (or, if applicable, a specific TMC) and a specific shuffling pattern code and these codes can be used by the processor 470, executing the CNN selector 427, to select the specific trained CNN. Alternatively, the CNN selector 427 can be trained recognize vocabulary sets and shuffling patterns from scrambled images. In this case, the processor 470, executing the CNN selector 427, can evaluate the specific scrambled image to recognize the specific vocabulary set and the specific shuffling pattern and can then select the specific trained CNN based on the specific vocabulary set and the specific shuffling pattern.

In any case, once the specific trained CNN is selected, the specific scrambled image can be evaluated by the processor 470, executing that specific trained selected trained CNN. This evaluation process will produce a specific output class number for the specific scrambled image. Since each word in each vocabulary set (or, if applicable, in each text map) is associated with a corresponding output class number, the results of this evaluation process can be used to identify (i.e., recognize) the specific word represented by the scrambled image. It should be noted that since, as discussed above with regard to the CNN developer 200, each vocabulary set comprises not only multiple different words and multiple instances of each of the different words depicted in different fonts, recognition of the specific word can be made regardless of the font used. Additionally, it should be noted that, as the level of granularity of the grid used for shuffling word images using a specific shuffling pattern increases (i.e., as the first number X of columns and the second number Y of rows in the grid increase), the recognition accuracy of CNNs, which are fine-tuned based on images scrambled using that shuffling pattern will decrease. However, the recognition accuracy will still remain relatively high. For example, the recognition accuracy may be over 95% (e.g., 96.4%) for CNNs, which are fine-tuned based on scrambled images scrambled according to specific shuffling pattern associated with a 3×3 grid, and at or above 90% for CNNs, which are fine-tuned based on scrambled images that were scrambled according to a specific shuffling pattern associated with a 75×75 grid.

Subsequently, a response can be generated (e.g., by the processor 470 executing a response generator 428) (828). This response can indicate, for each specific scrambled image in the obfuscated document, the specific vocabulary set code (VCS) (or, if applicable, the specific TMC) associated with the trained CNN that was used to evaluate the specific scrambled image and also the specific output class number acquired for that specific scrambled image by the selected CNN. This response can be communicated to the client computerized device 300 (e.g., by the network interface 460 over the WAN 101) (830).

Referring again to FIG. 8B, the response can be received, for example, by the network interface 360 of the client computerized device 300 (832). Then, the words represented by the scrambled images in the obfuscated document can be found using the information contained in the response (834). Specifically, for each specific scrambled image in the obfuscated document, the following can be performed: the specific vocabulary set indicated by the specific VCS (or, if applicable, the specific text map indicated by the specific TMC) that was referenced in the response can be accessed; the specific output class number referenced in response can be found in the specific vocabulary set (or, if applicable, in the specific text map); and the specific word associated with that specific output class number and represented by the specific scrambled image can be read out.

By avoiding reconstruction and storage of the image document on the server 400 and by further only communicating the specific output class number acquired for each scrambled image back to the client computerized device 300, the client-server image document processing system disclosed herein further minimizes risks associated with potential hacking of the server 400 or the communication channels used for communication between the client computerized device 300 and the server 400.

Figure 9:
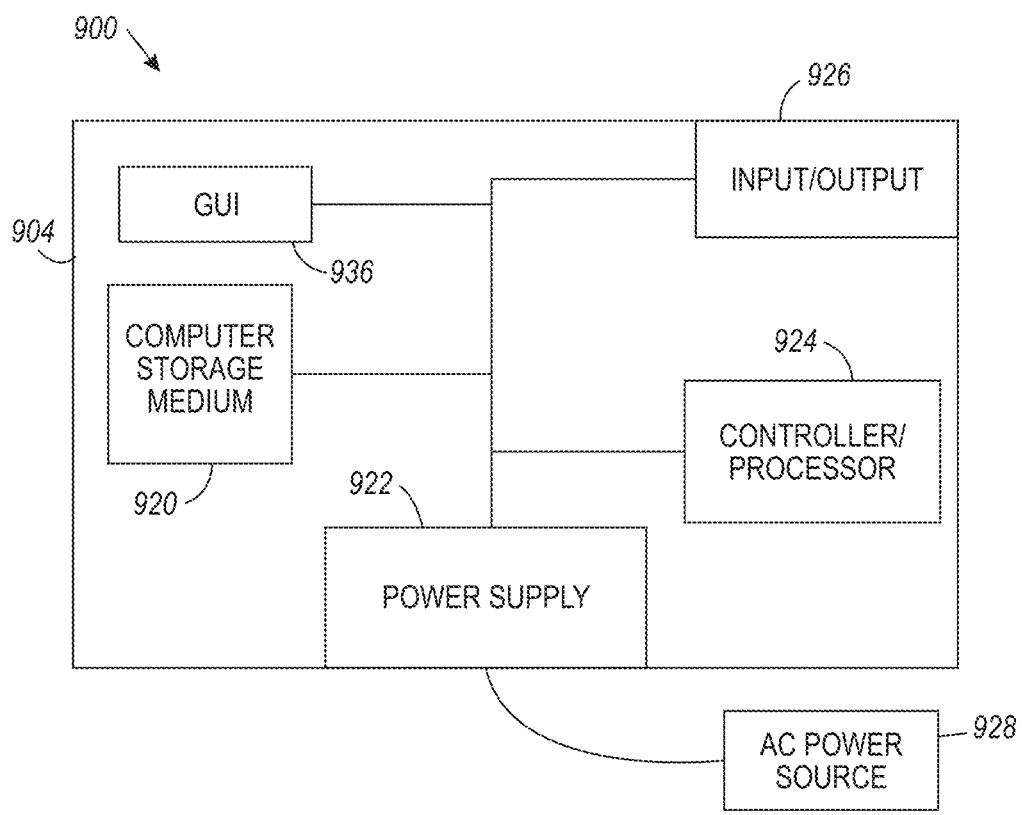
FIG. 9 illustrates an exemplary computerized device, which can be incorporated into the client-server image document processing environment of FIG. 1 as a CNN developer, a client computerized device or a server.

FIG. 9 illustrates an exemplary computerized device 900, which can be incorporated into the client-server image document processing environment of FIG. 1 as a CNN developer 200, a client computerized device 300 or a server 400. This computerized device 900 can comprise at least a housing 904 and, contained within the housing 904, multiple functional components including, but not limited to, a controller/processor 924, a communications port (i.e., an input/ output device) 926, and a memory (e.g., including, but not limited to, a non-transitory computer readable storage medium 920) operatively connected (e.g., over a system bus). The computerized device 900 can further comprise at least one accessory functional component, such as a display screen 936 for displaying graphic user interfaces for applications executed on the computerized device 900, in communication with the processor 924 (e.g., over the system bus). Optionally, the multiple functional components, including any accessory functional components, can operate on power supplied from an alternating current (AC) source 928 via an internal power supply 922. This internal power supply 922 can comprise a rechargeable power storage element (e.g., a rechargeable battery, etc.).

The communications port (i.e., the input/output device) 926 can be used for communications between the computerized device and other computerized devices over a wireless telecommunication network, such as 3G or 4G wireless telecommunication network or a local area telecommunication network. The controller/processor 924 can control the various actions of the computerized mobile device 900. The non-transitory computer-readable storage medium 920 can comprise, for example, an optical storage device, a magnetic storage device, a capacitor-based storage device or any other suitable computer-readable storage device. This computer-readable storage device can be readable by the controller/processor 924 and can store programs of instructions (e.g., applications) that the controller/processor 924 can execute to allow the computerized device 900 to perform its various functions and, particularly, the method steps discussed in detail above.

Figure 10:
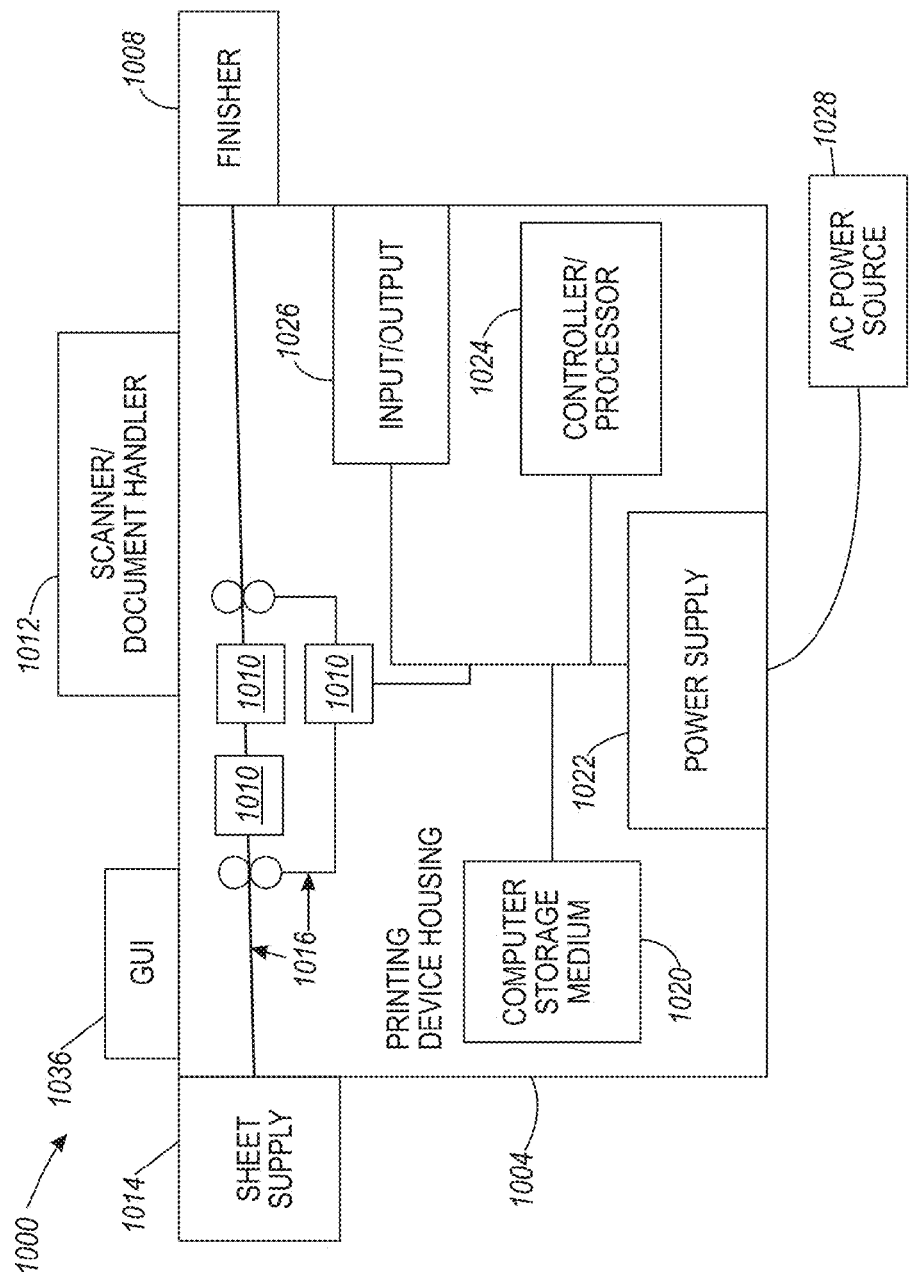
FIG. 10 illustrates an exemplary computerized multi-function printing device, which, optionally, can be incorporated into the client-server image document processing environment of FIG. 1 as a client computerized device.

FIG. 10 illustrates an exemplary computerized multi-function printing device 1000, which, optionally, can be incorporated into the client-server image document processing environment of FIG. 1 as a client computerized device 300. The printing device 1000 can comprise a housing 1004 and, contained within the housing 1004, multiple functional components including, but not limited to, a controller/processor 1024, a communications port (i.e., an input/output device) 1026, a memory (including, but not limited to, a non-transitory computer readable storage medium 1020), at least one print media path 1016, and at least one print engine 1010 (i.e., at least one marking device) operatively connected (e.g., over a system bus). The printing device 1000 can further comprise multiple accessory functional components, such as a display screen 1036 for displaying a graphic user interface (GUI) for programs executed on the printing device 1000, a sheet suppler 1014, a document finisher 1008 and a document scanner 1012 for scanning in image documents, in communication with the controller/processor 1024 (e.g., over the system bus). The multiple functional components, including any accessory functional components, can operate on power supplied from an alternating current (AC) source 1028 via an internal power supply 1022. This internal power supply 1022 can comprise a power storage element (e.g., a battery, etc.).

The communications port (i.e., the input/output device) 1026 can be used for communications between the printing device 1000 and other computerized devices (e.g., the CNN developer 200 or server(s) 400) over a wireless telecommunication network, such as 3G or 4G wireless telecommunication network or a local area telecommunication network. The controller/processor 1024 can control the various actions of the printing device 1000. The non-transitory computer-readable storage medium 1020 can comprise, for example, an optical storage device, a magnetic storage device, a capacitor-based storage device or any other suitable computer-readable storage device. This computer-readable storage device can be readable by the controller/processor 1024 and can store instructions that the controller/processor 1024 can execute to allow the printing device 1000 to perform its various functions. The media path(s) 1016 can be positioned to transport sheets of media from the sheet supplier 1014 through the print engine(s) 1010, as controlled by the controller/processor 1024. After receiving various markings from the printing engine(s) 1010, the sheets of media can be transmitted to an output tray (not shown) or, optionally, to the finisher 1008, which can fold, staple, sort, etc., the various printed sheets.

It should be noted that the methods performed by the devices (e.g., the CNN developer 200, the client computerized device(s) 300 and the server(s) 400) disclosed herein cannot be performed by a human alone and instead such methods can only be performed by the disclosed devices operating in the client-server image document processing environment, as described. Specifically, processes such as convolutional neural network (CNN) development and training, image document obfuscation using selected shuffling patterns, electronic transmission of data over networks, obfuscation document processing through execution of trained CNNs, etc., requires the utilization of different specialized devices. For example, processes such as CNN development and training by the CNN developer 200, image document obfuscation using selected shuffling patterns by a client computerized device 300 and execution of trained CNNs during obfuscate image processing by a server 400 cannot be performed manually by a user because such processes could take decades or lifetimes and because such processes are necessary for the implementation of the disclosed client-server document image processing environment.

It should also be noted that such device-only processes are not mere "post-solution activity" because these processes provide safeguards for data processed in the client-server document processing environment both during electronic transmission between client computerized device(s) and the server(s) and during processing by the server(s).

It should also be noted that the electronic transmissions between the client computerized device(s) and the server(s) over a network (e.g., the Internet) utilize special-purpose equipment (telecommunications equipment, routers, switches, etc.) that are distinct from a general-purpose processor and that such electronic transmissions are necessary for the implementation of the disclosed client-server image document processing environment. In other words, the various devices that are disclosed herein and used in the implementation of the disclosed client-server image document processing environment are integral with the disclosed methods because the methods cannot be performed without such devices (and cannot be performed by humans alone).

It should also be noted that the methods disclosed herein solve many highly complex technological problems. For example, as mentioned above, application service providers (APSs) suffer from the technological problem of not being fully capable of effectively safeguarding the privacy of text information contained in image documents transmitted to and processed by server(s) for text recognition. The methods disclosed herein solve this technological problem by only transmitting an obfuscated document from a client computerized device to a server, by providing a unique means for a server to recognize text information in the obfuscated document without having to reconstruct the original image document and by only transmitting code information back to the client computerized device, wherein the code information will allow a client computerized device to recognize the text information.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the devices and methods herein cannot be implied or imported from any above example as limitations to any particular order, number, position, size, shape, angle, color, or material.

Therefore, disclosed above are devices and methods for processing an image document in a client-server environment such that privacy of text information contained in the image document is preserved. Specifically, in a client-server environment, an image document can be processed using a local computerized device of a client to create an obfuscated document (i.e., a document that is rendered unclear, unintelligible, etc.) by identifying word images in the image document and scrambling those word images. The obfuscated document can be received by a server of a service provider over a network (e.g., the Internet) and processed by previously trained software (e.g., a previously trained convolutional neural network (CNN)) to recognize specific words represented by the scrambled images in the obfuscated document and, thereby perform text recognition without having to reconstruct the image document. Since the image document is neither communicated over the network, nor reconstructed and stored on the server, privacy concerns are minimized.

What is claimed is:

1. A computerized device comprising:
    a network interface connected to a network; and
    a processor in communication with the network interface and performing the following:
        analyzing an image document to identify at least one text region within the image document and at least one word image contained in the at least one text region;
        for each word image, randomly selecting a shuffling pattern, resizing the word image to a predetermined size so that a height and width of the word image are equal to a height and width of a grid of cells that is associated with the shuffling pattern, overlaying the grid of cells onto the word image such that the cells contain portions of the word image, and shuffling positions of the cells within the grid according to the shuffling pattern to move the portions of the word image and create a corresponding scrambled image; and
        replacing all word images in the image document with corresponding scrambled images to generate an obfuscated document,
    the network interface communicating the obfuscated document to a computer server over the network, wherein the computer server is capable of individually evaluating the scrambled images using trained software to recognize specific words.

2. The computerized device of claim 1, the image document comprising any of a digital photograph received from a digital camera and a scanned-in document received from a scanner.

3. The computerized device of claim 1, the grid of cells having a first number of columns and a second number of rows, the first number of columns and the second number of rows being sufficient to ensure that a word contained in the word image is incomprehensible to a user that views the scrambled image.

4. The computerized device of claim 1, the shuffling pattern being randomly selected from a set of shuffling patterns.

5. A computer server comprising:
    a network interface receiving, from a computerized device over a network, an obfuscated document,
        the obfuscated document created by the computerized device from an image document comprising at least one word image, and
        the obfuscated document comprising at least one scrambled image, each scrambled image corresponding to a single word image in the image document;
    a processor in communication with the network interface and processing the obfuscated document,
        the processing comprising evaluating each specific scrambled image individually to recognize a specific word represented by the specific scrambled image, and
        the processing being performed without reconstructing the image document; and
    a memory storing multiple trained convolutional neural networks, each trained convolutional neural network having been initially developed using a database of images and then fine-tuned using scrambled word images acquired by scrambling specific word images from a specific vocabulary set using a specific shuffling pattern, each word in the specific vocabulary set being associated with a corresponding output class number, and the processor processing the obfuscated document by executing a selected trained convolutional neural network to produce a specific output class number for the specific scrambled image and, thereby to recognize the specific word associated with the specific output class number and represented by the specific scrambled image.

6. The computer server of claim 5, the processor further selecting the selected trained convolutional neural network based on a specific vocabulary set code and a specific shuffling pattern code associated with the specific scrambled image in the obfuscated document.

7. The computer server of claim 5, the processor further evaluating the specific scrambled image to determine the specific vocabulary set and the specific shuffling pattern and selecting the selected trained convolutional neural network based on the specific vocabulary set and the specific shuffling pattern.

8. The computer server of claim 5, the specific vocabulary set comprising multiple different words and multiple instances of each of the different words depicted in different fonts.

9. The computer server of claim 5, the processor generating a response indicating the specific output class number and communicating the response to the computerized device.

10. A method comprising:

analyzing, by a processor of a computerized device, an image document to identify at least one text region and at least one word image contained in the at least one text region;

for each word image, performing, by the processor, the following: randomly selecting a shuffling pattern, resizing the word image to a predetermined size so that a height and width of the word image are equal to a height and width of a grid of cells that is associated with the shuffling pattern, overlaying of the grid of cells onto the word image such that the cells contain portions of the word image, and shuffling of positions of the cells within the grid according to the shuffling patterning to move the portions of the word image and create a corresponding scrambled image;

replacing, by the processor, all word images in the image document with corresponding scrambled images to generate an obfuscated document; and, communicating, by a network interface of the computerized device, the obfuscated document to a computer server over a network, wherein the computer server is capable of individually evaluating the scrambled images using trained software to recognize specific words.

11. The method of claim 10, the image document comprising any of a digital photograph received from a digital camera and a scanned-in document received from a scanner.

12. The method of claim 10, the grid of cells having a first number of columns and a second number of cells, the first number of columns and the second number of rows being sufficient to ensure that a word contained in the word image is incomprehensible to a user that views the scrambled image.

13. The method of claim 10, the shuffling pattern being randomly selected from a set of shuffling patterns.

14. A method comprising:

storing, in a memory of a computer server, multiple trained convolutional neural networks, each trained convolutional neural network having been initially developed using a database of images and then fine-tuned using scrambled word images acquired by scrambling specific word images from a specific vocabulary set using a specific shuffling pattern, and each word in the specific vocabulary set being associated with a corresponding output class number;

receiving, by a network interface of the computer server from a computerized device over a network, an obfuscated document, the obfuscated document created by the computerized device from an image document comprising at least one word image, and the obfuscated document comprising at least one scrambled image, each scrambled image corresponding to a single word image in the image document; and, processing, by a processor of the computer server, the obfuscated document without reconstructing the image document, the processing comprising evaluating each specific scrambled image individually to recognize a specific word represented by the specific scrambled image and the processing of the obfuscated document further comprising executing a selected trained convolutional neural network to produce a specific output class number for the specific scrambled image and, thereby to recognize the specific word associated with the specific output class number and represented by the specific scrambled image.

15. The method of claim 14, the processing of the obfuscated document comprising selecting the selected trained convolutional neural network based on a specific vocabulary set code and a specific shuffling pattern code associated with the specific scrambled image in the obfuscated document.

16. The method of claim 14, the processing of the obfuscated document comprising evaluating the specific scrambled image to determine the specific vocabulary set and the specific shuffling pattern and selecting the selected trained convolutional neural network based on the specific vocabulary set and the specific shuffling pattern.

17. The method of claim 14, the specific vocabulary set comprising multiple different words and multiple instances of each of the different words depicted in different fonts.

18. The method of claim 14, further comprising generating a response indicating the specific output class number and communicating the response to the computerized device.

* * * * *